(12) United States Patent
Caron et al.

(10) Patent No.: US 11,807,045 B2
(45) Date of Patent: Nov. 7, 2023

(54) TIRE WITH HYBRID SIPE PATTERN

(71) Applicant: The Goodyear Tire & Rubber Company, Akron, OH (US)

(72) Inventors: Arnaud Caron, Signeulx (BE); Tibor Fülöp, Erpeldange-Wiltz (LU); Damian Wilhelm Georges, Mullendorf (LU); Pit Jean-Pierre Fernand Polfer, Lorentzweiler (LU); Ananth Bhagavathapuram Srisailapathy, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/663,686

(22) Filed: May 17, 2022

(65) Prior Publication Data

US 2022/0396098 A1 Dec. 15, 2022

Related U.S. Application Data

(60) Provisional application No. 63/210,118, filed on Jun. 14, 2021.

(51) Int. Cl.
*B60C 11/12* (2006.01)

(52) U.S. Cl.
CPC ........ *B60C 11/124* (2013.01); *B60C 11/1218* (2013.01); *B60C 11/1263* (2013.01); *B60C 2011/1209* (2013.01); *B60C 2011/1268* (2013.01)

(58) Field of Classification Search
CPC ............... B60C 11/124; B60C 11/1218; B60C 2011/1268
See application file for complete search history.

(56) References Cited

U.S. PATENT DOCUMENTS

| 4,298,046 | A | 11/1981 | Herbelleau et al. |
| 4,934,424 | A * | 6/1990 | Kojima ............... B60C 11/12 152/902 |
| 6,382,283 | B1 | 5/2002 | Caretta |
| 6,427,737 | B1 | 8/2002 | Katayama |
| 7,090,735 | B2 | 8/2006 | Neugebauer et al. |
| 7,487,810 | B2 | 2/2009 | Kishida |
| 10,507,696 | B2 | 12/2019 | Kaji et al. |

(Continued)

FOREIGN PATENT DOCUMENTS

| EP | 0810104 A1 | 12/1997 |
| EP | 3145730 A1 | 3/2017 |

(Continued)

OTHER PUBLICATIONS

JP 2017-218048 Machine Translation, Masayuki, Arima (Year: 2017).*

(Continued)

*Primary Examiner* — Cedrick S Williams
*Assistant Examiner* — Nicholas J Weiler
(74) *Attorney, Agent, or Firm* — June E. Rickey

(57) ABSTRACT

The subject invention discloses a tire (1) having at least one sipe pattern comprising, in the circumferential direction of the tire (1), one or more straight sipes (15) and two or more inclined sipes (17, 19, 37, 39); wherein at least one straight sipe (15) is arranged between two or more inclined sipes (17, 19, 37, 39).

4 Claims, 9 Drawing Sheets

(56) References Cited

U.S. PATENT DOCUMENTS

2012/0160383 A1* 6/2012 De Barsy ............ B60C 11/1272
                                                    152/209.18
2015/0306915 A1* 10/2015 Ledieu ................ B60C 11/1218
                                                    152/209.17

FOREIGN PATENT DOCUMENTS

| JP | H10138715 A | | 5/1998 | |
|----|-------------|---|--------|---|
| JP | 2001063322 A | | 3/2001 | |
| JP | 2011218831 A | | 11/2011 | |
| JP | 2017218048 A | * | 12/2017 | |
| JP | 2017218048 A | | 12/2017 | |
| WO | 2011125293 A1 | | 10/2011 | |
| WO | 2017023355 A1 | | 2/2017 | |
| WO | WO-2017023805 A1 | * | 2/2017 | .............. B60C 11/11 |

OTHER PUBLICATIONS

European Search Report for Serial No. EP22174168 dated Oct. 13, 2022.

* cited by examiner

TIRE WITH HYBRID SIPE PATTERN

TECHNICAL FIELD

The present disclosure relates to a tire having a plurality of sipes that is particularly useful as an all-season tire or winter tire.

TECHNICAL BACKGROUND

All-season tires and winter tires require good performance and traction characteristics on snow covered road surfaces. Such tires are therefore typically provided with a plurality of sipes formed in one or more tread blocks and/or one or more ribs of the tread portion of the tire.

The tires having sipes exhibit improved snow performance but dry and wet performance of the tire may deteriorate because the finely-sectioned blocks have limited rigidity. To overcome these drawbacks, the tire comprises three-dimensional sipes that change direction not only at a ground contact surface of a tread but also in the depth direction thereof, to facilitate contact between the finely-sectioned block portions thereof and thus minimize or suppress the deformation of the finely-sectioned block portions. However, it was found that such a configuration may deteriorate the snow performance. As a result, it was found difficult to improve at the same time the snow performances, the wet performance and the dry performance.

EP0810104 discloses a tread for winter tires consisting of elastomeric material extending in a circumferential direction around the axis of rotation of the tire. The tread includes several grooves which extend circumferentially and multiple grooves which extend laterally between a pair of shoulders, delimiting elastomeric blocks. The elastomeric blocks include sipes delimiting two opposing surfaces within the blocks. The sipes may define a portion of a cylindrical surface over at least a part of their radial and lateral area.

EP3446891 discloses a tire comprising a sipe extending in a predetermined direction and formed on a tire tread portion, wherein in a tread surface view, the sipe includes a first straight sipe extended linearly in the predetermined direction, a second straight sipe extending linearly in the predetermined direction, and a projection portion formed between the first straight sipe and the second straight sipe extending in a direction crossing the predetermined direction. The projection portion includes a straight portion extending linearly, a first inclined portion continued to one end of the straight portion and one end of the first straight sipe and inclined to spread toward an outer side in the predetermined direction from the one end of the straight portion, and a second inclined portion continued to another end of the straight portion and one end of the second straight sipe and inclined to spread toward an outer side in the predetermined direction from the another end of the straight portion; and a period defined by a length of the projection portion in the predetermined direction is 0.8 times to 2.0 times as large as a sipe depth defined by a length of the sipe between the tire tread portion and a bottom of the sipe.

US2015/0266346 discloses a pneumatic tire having a plurality of sipes formed in the land portions of a tread thereof, each extending in the tire width direction, wherein in a cross-section of the land portion orthogonal to the sipe extending direction, provided that an imaginary sipe main direction links two ends in the tire radial direction of each sipe, at least two of the sipes are "inclined sipes". Each inclined sipe has a sipe main direction inclined relative to the tire radial direction; and has inner bent portions each protruding relative to the sipe main direction with peaks positioned deeper than 20% of the sipe depth. The sipe main direction(s) of at least one of the inclined sipes are inclined in a direction opposite, relative to the tire radial direction, to the sipe main direction of any of the other inclined sipes.

US2015306915 relates to a snow tire tread comprising a plurality of blocks separated by grooves. The blocks are provided with incisions that are separated into multiple parts from a certain depth, known as complex incisions. In sectional view, each complex incision has a first straight part extending radially from the running surface of the tread and a second part extending from the first part and comprising at least two branches, each branch comprising an end. The tread also comprises cavities, each cavity extending between the branches of a complex incision. Each cavity comprises a base located at the same level as the ends of the branches. The cavities and the grooves of the tread are configured such that the tread has an end-of-wear surface grooving rate greater than or equal to 35%. In addition, the distance (D) between two branches of two adjacent complex incisions is at least equal to 2 mm.

There is a need for an improved combination of stiffness and one or more of friction, traction and braking performance of the tire on snow. There is a need for an improved compromise between stiffness and friction coefficient of the tire, in particular there is a need to find an improved compromise between stiffness of the tire, traction and friction coefficient on snow.

SUMMARY OF THE INVENTION

One or more of the above needs can be fulfilled by the tire according to the invention wherein the tire comprises a particular sipe pattern comprising, in the circumferential direction of the tire, one or more straight sipes extending in the radial direction of the tire arranged between two or more inclined sipes. The use of such a sipe pattern allows a good compromise between stiffness and one or more of friction, traction and braking performance of the tire on snow. It has also been found that the use of such a sipe pattern allows a good compromise between stiffness and friction coefficient, such as a compromise between stiffness, friction coefficient, traction performances and braking performances.

According to a first aspect, the invention is directed to a tire with a tread portion comprising one or more tread blocks and/or one or more ribs, and having a plurality of sipes formed in one or more tread blocks and/or one or more ribs, each sipe being opened at the radially outer surface of a tread block or a rib; wherein the tire has at least one sipe pattern (or arrangement) comprising, in the circumferential direction of the tire, one or more straight sipes extending in the radial direction of the tire and two or more inclined sipes; wherein at least one straight sipe is arranged between two inclined sipes; wherein the inclined sipes have a main sipe direction that is inclined by an angle α relative to the radial direction, the main sipe direction of an inclined sipe being the line linking the open end of the sipe at the radially outer surface of a tread block or a rib and an innermost end of the sipe in the tire radial direction; wherein one or more inclined sipes are positively inclined sipes and one or more inclined sipes are negatively inclined sipes; the one or more positively inclined sipes being inclined in a direction opposite, relative to the tire radial direction, to the one or more negatively inclined sipes; and wherein one or more inclined sipes have a curved shape along the length of the sipe or comprise at least one fold dividing the inclined sipe in two or more sub-portions being successive along the length of the sipe; the length of a sipe being the distance from its open end to its innermost end.

According to a second aspect, the invention is directed to a tire with a tread portion comprising one or more tread blocks and/or one or more ribs, and having a plurality of sipes formed in one or more tread blocks and/or one or more ribs, each sipe being opened at the radially outer surface of a tread block or a rib; wherein one or more blocks and/or one or more ribs have at least one sipe pattern (or arrangement) comprising, in the circumferential direction of the tire, one or more straight sipes extending in the radial direction of the tire and two or more inclined sipes; wherein at least one straight sipe is arranged between two inclined sipes; wherein the inclined sipes have a main sipe direction that is inclined by an angle $\alpha$ relative to the radial direction, the main sipe direction of an inclined sipe being the line linking the open end of the sipe at the radially outer surface of a tread block or a rib and an innermost end of the sipe in the tire radial direction; wherein one or more inclined sipes are positively inclined sipes and one or more inclined sipes are negatively inclined sipes; the one or more positively inclined sipes being inclined in a direction opposite, relative to the tire radial direction, to the one or more negatively inclined sipes; and wherein at least two inclined sipes have different depth wherein the one or more inclined sipes being the deepest sipes are long inclined sipes and have a defined depth and at least one inclined sipe is a short inclined sipe having a depth that is ranging from 30% to 70% of the depth of the one or more long inclined sipes; the depth of a sipe being determined according to the radial direction of the tire.

According to a third aspect, the invention is directed to a tire with a tread portion which is divided in the tire width direction between (or in) a central portion arranged between two shoulder portions, and at least one of the central portion or the shoulder portions are rib-shaped, or are block-shaped and comprise tread blocks delimited by at least one circumferential groove extending in the tire circumferential direction and at least two lateral grooves communicating with the at least one circumferential groove; the tire having a plurality of sipes formed in one or more tread blocks and/or one or more ribs, each sipe being opened at the radially outer surface of a tread block or a rib; wherein one or more blocks and/or one or more ribs have a sipe pattern (or arrangement) comprising, in the circumferential direction of the tire, one or more straight sipes extending in the radial direction of the tire and two or more inclined sipes; wherein at least one straight sipe is arranged between two inclined sipes; wherein the inclined sipes have a main sipe direction that is inclined by an angle $\alpha$ relative to the radial direction, the main sipe direction of an inclined sipe being the line linking the open end of the sipe at the radially outer surface of a tread block or a rib and an innermost end of the sipe in the tire radial direction; wherein one or more inclined sipes are positively inclined sipes and one or more inclined sipes are negatively inclined sipes; the one or more positively inclined sipes being inclined in a direction opposite, relative to the tire radial direction, to the one or more negatively inclined sipes; wherein at least two sipes of the sipe pattern have a depth of at least 6 mm and wherein one or more inclined sipes have a curved shape along the length of the sipe or comprise at least one fold dividing the inclined sipe in two or more sub-portions being successive along the length of the sipe; and further wherein the one or more straight sipes and the two or more inclined sipes have directions divergent from each other from their open ends to their innermost ends; the length of a sipe being the distance from its open end to its innermost end.

According to a fourth aspect, the invention is directed to a tire with a tread portion which is divided in the tire width direction between (or in) a central portion arranged between two shoulder portions and at least one of the central portion or the shoulder portions are rib-shaped or are block-shaped and comprise tread blocks delimited by at least one circumferential groove extending in the tire circumferential direction and at least two lateral grooves communicating with or joining the at least one circumferential groove; the tire having a plurality of sipes formed in one or more tread blocks and/or one or more ribs, each sipe being opened at the radially outer surface; wherein one or more blocks and/or one or more ribs have a sipe pattern comprising, in the circumferential direction of the tire, one or more straight sipes extending in the radial direction of the tire and two or more inclined sipes; wherein at least one straight sipe is arranged between two inclined sipes; wherein the inclined sipes have a main sipe direction that is inclined by an angle $\alpha$ relative to the radial direction, the main sipe direction of an inclined sipe being the line linking the open end of the sipe at the radially outer surface of a tread block or a rib and an innermost end of the sipe in the tire radial direction; wherein one or more inclined sipes are positively inclined sipes and one or more inclined sipes are negatively inclined sipes; the one or more positively inclined sipes being inclined in a direction opposite, relative to the tire radial direction, to the one or more negatively inclined sipes; and wherein the one or more straight sipes and the two or more inclined sipes have directions divergent from each other from their open ends to their innermost ends.

The following can be used to further define the tire according to the first aspect, the second aspect, the third aspect or the fourth aspect. In the present description, the sipes are transversal sipes and extend in the width direction of the tire.

For example, the tire is a pneumatic tire or a non-pneumatic tire; with preference, the tire is a pneumatic tire. The tread pattern of the tire can be symmetric or asymmetric. For example, the tire has a symmetric tread pattern. For example, the tire has a directional tread pattern.

It is preferred that at least two sipes of the sipe pattern have a depth of at least 6 mm; preferably at least 7 mm; and more preferably at least 8 mm.

It is preferred that at least one straight sipe is arranged between at least one positively inclined sipe and at least one negatively inclined sipe.

With regard to the inclined sipes the angle $\alpha$ of inclination shown by the main sipe direction of the inclined sipes is typically within the range of 5° to 30° relative to the radial direction of the tire; preferably within the range of 10° to 27°; more preferably within the range of 15° to 25°; and even more preferably within the range of 18° to 22°.

The angle $\alpha$ of inclination shown by the main sipe direction of at least one positively inclined sipes is different from the angle $\alpha$ of inclination shown by the main sipe direction of at least one negatively inclined sipe; with preference, the angle $\alpha$ of inclination shown by the main sipe direction of at least one positively inclined sipes is smaller than the angle $\alpha$ of inclination shown by the main sipe direction of at least one negatively inclined sipe.

For example, one or more inclined sipes have a straight sub-portion that extends in the tire radial direction and one or more inclined sub-portions. With preference, the straight sub-portion extends in the radial direction of the tire at a depth ranging from 5% to 20% of the total depth of the inclined sipe; preferably from 8% to 18%; more preferably from 10% to 15%. With preference, the straight sub-portion is arranged at the open end of the inclined sipe at the radially outer surface of a tread block or a rib. The depth of a sipe is determined in the radial direction of the tire.

In one embodiment of this invention, one or more inclined sipes have a first inclined sub-portion and at least a subsequent inclined sub-portion; wherein the angle β of inclination relative to the tire radial direction of the first inclined sub-portion is smaller than the angle γ of inclination of the one or more subsequent inclined sub-portion. With preference, none of the inclined sub-portions intersects the sipe main direction.

For example, the angle β of inclination relative to the tire radial direction of the first inclined sub-portion typically ranges from 5° to 20°; preferably from 8° to 18°; and more preferably from 10° to 15°.

With preference, the first inclined sub-portion has an innermost end in the tire radial direction arranged to be at a depth that is within the range of 40% to 70% of the total depth of the inclined sipe; preferably from 42% to 60%; and more preferably from 45% to 55%. The depth of a sipe is determined in the radial direction of the tire.

In an embodiment, the one or more long inclined sipes have a first inclined sub-portion and at least a subsequent inclined sub-portion and the one or more short inclined sipes have a single inclined portion or sub-portion.

In an embodiment, the number of negatively inclined sipes is equal to or greater than the number of positively inclined sipes.

In a preferred embodiment, at least two inclined sipes have different depth wherein the one or more inclined sipes being the deepest sipes are long inclined sipes and have a defined depth and at least one inclined sipe is a short inclined sipe having a depth that is within the range of 30% to 70% of the depth of the one or more long inclined sipes; preferably within the range of 40% to 60%; and more preferably within the range of 45% to 55%.

For example, at least one long positively inclined sipe and at least one long negatively inclined sipe have a depth of at least 6 mm; preferably at least 7 mm, and more preferably at least 8 mm.

For example, the angle α of inclination shown by the main sipe direction of at least one long inclined sipe is different from the angle α of inclination shown by the main sipe direction of at least one short inclined sipe; with preference, the angle α of inclination shown by the main sipe direction of at least one long inclined sipe is smaller than the angle α of inclination shown by the main sipe direction of at least one short inclined sipe.

For example, the thickness shown by (or of) at least one long inclined sipe is equal to or greater than the thickness shown by (or of) at least one short inclined sipe.

It is preferred that the orientation of the inclined sipes in the sipe pattern is selected to have the main sipe direction of the one or more inclined sipes that are intersecting the main sipe direction of the one or more straight sipes outside the tire.

It is preferred that the bottom of each long inclined sipe is raised in the vicinity of a position where the long inclined sipe opens to a circumferential groove.

The one or more of the straight sipes have a main sipe direction that extends in the radial direction of the tire. In one embodiment of this invention, the one or more straight sipes have a reduced depth in comparison to the inclined sipes or at least the long inclined sipes, so that the one or more straight sipes are reduced straight sipes having a depth that is within the range of 30% to 70% of the depth of the one or more long inclined sipes; preferably within the range of 40% to 60%; and more preferably within the range of 45% to 55%. In one embodiment of this invention more than one of the straight sipes have a reduced depth as compared to the longest inclined sipes.

For example, at least one straight sipe has a depth of at least 6 mm; preferably at least 7 mm, more preferably at least 8 mm. For example, at least one long straight sipe has a depth of at least 6 mm; preferably at least 7 mm, and more preferably at least 8 mm.

For example, one or more straight sipes are forked sipes and have their radially inner portion is divided in two branches; with preference, the branches are inclined.

For example, one or more straight sipes are forked sipes and comprise a radially outer sub-portion opened at the tread surface and a radially inner sub-portion that is divided in two branches, wherein the radially outer portion is extending in the radial direction of the tire at a depth that is within the range of 30% to 70% of the total depth of the straight sipes. The depth of a sipe is determined in the radial direction of the tire.

It is preferred that the bottom of each long straight sipe is raised in the vicinity of a position where the long straight sipe opens to a circumferential groove.

DESCRIPTION OF THE DRAWINGS

The invention will be described by way of example and with reference to the accompanying drawings in which.

DEFINITIONS

Figure 1:
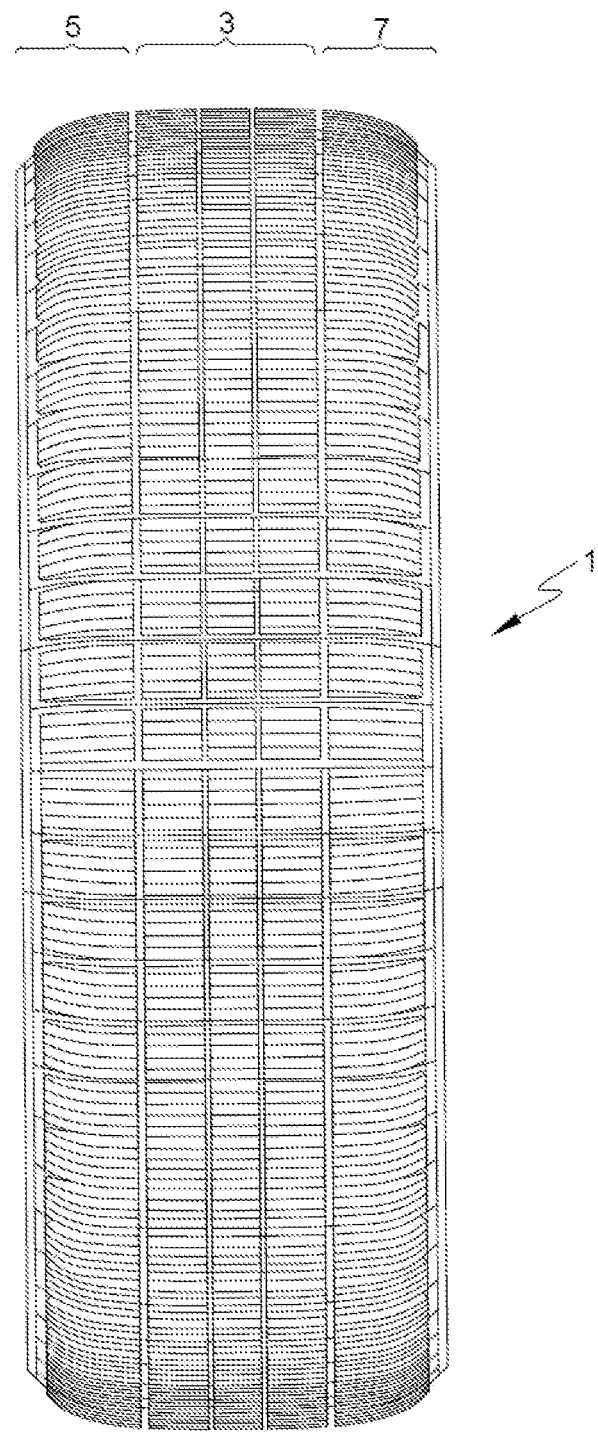
FIG. 1 is a plan view of a tire with a symmetric tread according to an embodiment of the invention.

For purposes hereof, the following definitions are provided.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 includes 1, 2, 3, 4 and 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

Unless otherwise defined, all terms used in the disclosure, including technical and scientific terms, have the meaning as commonly understood by one skilled in the art to which this disclosure belongs. By means of further guidance, definitions for the terms used in the description are included to better appreciate the teaching of the present disclosure.

"Asymmetric tread" means a tread that has a tread pattern not symmetrical to the center plane or the equatorial plane of the tire.

"Symmetric tread" means a tread that has a tread pattern symmetrical to the center plane or the equatorial plane of the tire.

"Circumferential" means lines or direction extending along the perimeter of the surface of the annular tread perpendicular to the axial direction.

"Axial" means lines or directions that are parallel to the axis of rotation of the tire.

"Groove" means an elongated void area in a tread that can extend circumferentially or laterally along the tread in a straight, curved or zigzag manner. Circumferentially and laterally extending grooves sometimes have common portions.

"Sipes" means (small) slots molded into the tread elements that subdivide the tread surface and may improve traction and/or braking performance. A sipe is narrower than a groove.

"Directional Tread Pattern" means a tread pattern designed for a specific direction of rotation of the tire.

"Rib" means a circumferentially extending strip of rubber on the tread which is defined or delimited by at least one circumferential groove and either a second groove or a lateral edge of the tread.

DETAILED DESCRIPTION OF THE INVENTION

The following is description of a pneumatic or non-pneumatic tire according to an embodiment of the present invention.

Figure 2:
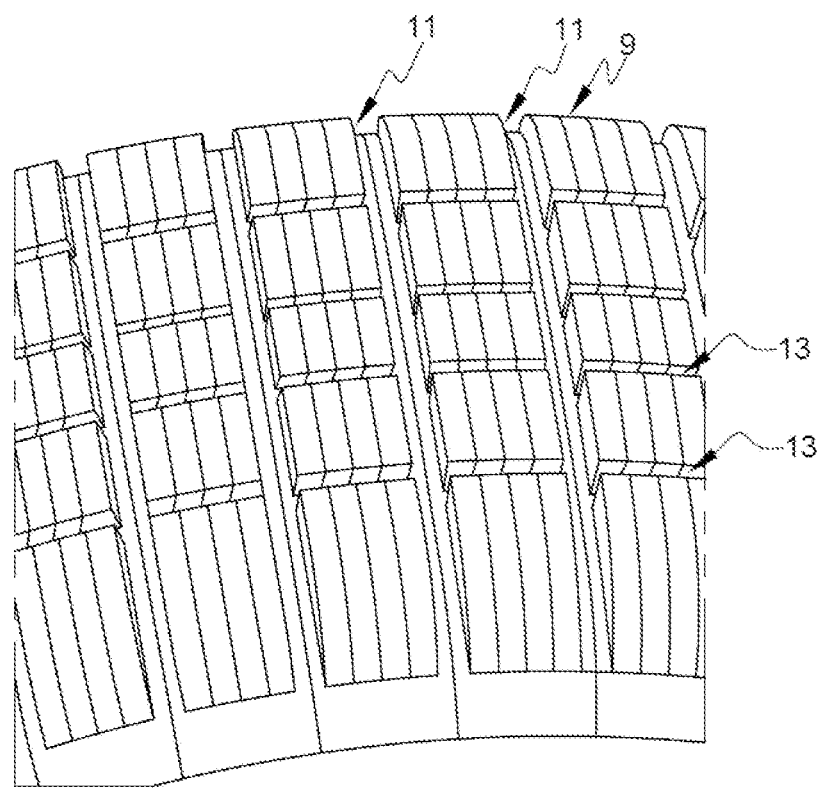
FIG. 2 is an enlarged partial view of a tread portion of the tire of FIG. 1.

Reference is made to FIG. 1 that illustrates a tire 1 and FIG. 2 representing a partial view of the tread portion of the tire 1.

The tire 1 includes a tread portion extending in a tire width direction, a pair of sidewall portions (not shown) extending inward in a tire radial direction from both ends of the tread portion and a pair of bead portions (not shown) each provided at an inner end of a corresponding one of the pair of sidewall portions in the tire radial direction. In the tread portion, a plurality of ribs is formed by a plurality of main circumferential grooves (i.e., extending in the tire circumferential direction) which can further be split into blocks. In the present disclosure the wording "block" is a synonym of "tread block". The tire can be a pneumatic tire or a non-pneumatic tire with it being preferred for the tire to be a pneumatic tire.

For example, the tire is an all-season tire or a winter tire and is preferably a winter tire. For example, the tire is an all-season pneumatic tire or a winter pneumatic tire; with preference, a winter pneumatic tire. For example, the tire is an all-season non-pneumatic tire or a winter non-pneumatic tire. The winter tire and/or the all-season tire may show a "three-peak mountain snowflake" symbol (i.e., "3PMSF" symbol).

The tread pattern of the tire can be symmetric or asymmetric. With preference, the tire has a symmetric tread.

The tire 1 includes from two to five main grooves extending in the tire circumferential direction arranged from a lateral outside (i.e., the right side in FIG. 1) to a lateral inside (i.e., the left side in FIG. 1). The distinction between outer side and inner side of the tire 1 is relevant in embodiments in which the tire has an asymmetric tread. In such a case, the tires show marks to differentiate the two sides so that the side marked "outside" is oriented towards the outside of the vehicle and the "inside" side is essentially oriented towards the center or centerline of the vehicle when the tire is mounted on the vehicle. The person skilled in the art will adapt the below description without any difficulty to the embodiment wherein the tread of the tire is symmetric, with the outer shoulder portion being symmetrical to the inner shoulder portion with respect to the equatorial plane of the tire. Tires with symmetric treads are devoid of marks to differentiate the two sides. In FIG. 1, the tire 1 comprises four main grooves extending in the tire circumferential direction. The main circumferential grooves are depressed inward in the tire radial direction.

The circumferential grooves can be straight (as illustrated in FIG. 1) or can extend in a zig-zag shape in the tire circumferential direction (not shown). The outside and inside circumferential grooves define the shoulder portions 5, 7. The portion disposed between the outside/laterally outer main circumferential groove and the inside/laterally inner main circumferential groove forms the central portion 3 of the tire 1.

The tire 1 has a plurality of sipes formed in the tread portion and opened at the radially outer surface of a tread block or a rib. In a preferred embodiment of the disclosure, illustrated in FIG. 2, the tread portion comprises one or more blocks 9, each being delimited by at least one circumferential groove 13 extending in the tire circumferential direction and at least two lateral grooves 11 communicating or intersecting with the at least one circumferential groove 13. The tread portion may also comprise one or more ribs that are not divided into blocks but that have sipes. For example, the sipes (i.e., the straight sipes and/or the inclined sipes) have an open end at the radially outer surface of a tread block or a rib and an innermost end in the tire radial direction, wherein the sipes have a constant thickness along with their length (i.e., from their open end to their innermost end) or have a thickness that is decreasing from their open end to their innermost end. Indeed, in the present disclosure, the length of a sipe is measured from its open end to its innermost end, following the shape of the sipe. The length of a sipe is equal to or greater than its depth. The depth of a sipe is determined according to the radial direction of the tire. Thus, a straight sipe may have a length that is equal to its depth whereas and inclined sipe will have a length that is greater than its depth for obvious geometrical reasons.

Figure 3:
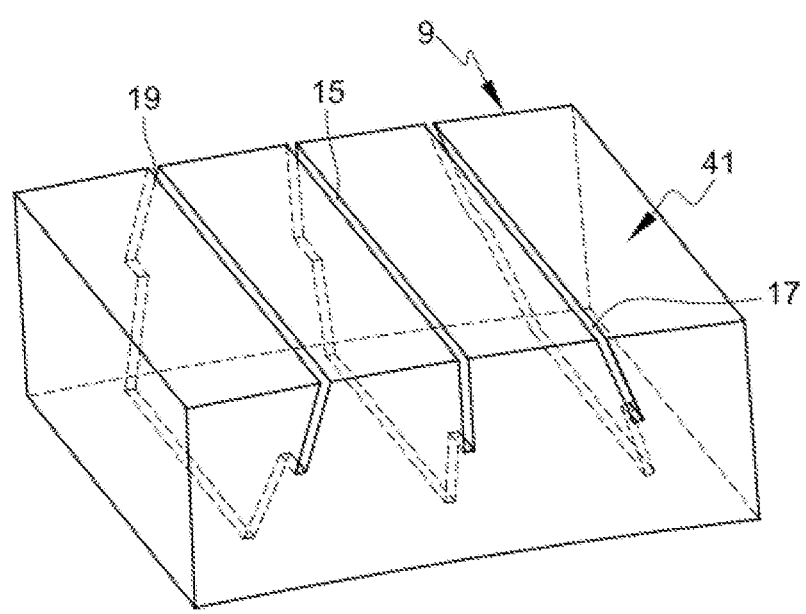
FIG. 3 is a perspective view of a block of the tire of FIG. 1 showing an example of a sipe pattern according to an embodiment of the invention.

As illustrated in the embodiment of FIG. 3, a tire has a plurality of sipes formed in a tread block or a rib and opened at the radially outer surface 41 of a tread block or a rib wherein the tire is having at least one sipe pattern comprising, in the circumferential direction of the tire, one or more straight sipes 15 extending in the radial direction of the tire and two or more inclined sipes 17, 19, wherein at least one straight sipe 15 is arranged between two or more inclined sipes 17, 19. This sipe pattern or arrangement can be found in at least one rib or in at least one block.

In an embodiment, one or more of i) at least one of the shoulder portions and ii) the central portion are block-shaped and comprise blocks 9 delimited by at least one circumferential groove extending in the tire circumferential direction and at least two lateral grooves communicating or intersecting with the at least one circumferential groove; wherein the tire has a plurality of sipes formed in a tread block or a rib and opened at the radially outer surface 41 of a tread block or a rib, wherein one or more blocks 9 and/or one or more ribs have a sipe pattern comprising, in the circumferential direction of the tire, one or more straight sipes 15 extending in the radial direction of the tire arranged between two or more inclined sipes 17, 19.

The one or more blocks can be one or more blocks of the central portion and/or one or more blocks of the shoulder portions (i.e., one or more blocks of the inner shoulder portion and/or one or more blocks of the outer shoulder portion). The one or more ribs can be one or more ribs of the central portion and/or one or more ribs of the shoulder portions (i.e., one or more ribs of the inner shoulder portion and/or one or more ribs of the outer shoulder portion). For example, all the blocks and/or all the ribs show the sipe pattern comprising, in the circumferential direction of the tire, one or more straight sipes 15 extending in the radial direction of the tire and two or more inclined sipes 17, 19; wherein at least one straight sipe 15 is arranged between two or more inclined sipes 17, 19. In one embodiment of this invention, the tire comprises two blocks being successive in the circumferential direction of the tire or in the width direction of the tire, and both blocks show the sipe pattern comprising, in the circumferential direction of the tire, one or more straight sipes 15 extending in the radial direction of the tire and two or more inclined sipes 17, 19; wherein at least one straight sipe 15 is arranged between two or more inclined sipes 17, 19. In an embodiment, the tire comprises two blocks being successive in the circumferential direction of the tire or in the width direction of the tire, and only one of the two successive blocks show the sipe pattern comprising, in the circumferential direction of the tire, one or more straight sipes 15 extending in the radial direction of the tire and two or more inclined sipes 17, 19; wherein at least one straight sipe 15 is arranged between two or more inclined sipes 17, 19. An example is provided in FIG. 12 wherein the tire comprises combination of blocks 9 with the defined sipe pattern, and blocks 47 that do not show the said sipe pattern. Indeed, in FIG. 12, the blocks 47 only show two inclined sipes 17, 19 and not the straight sipe.

In a preferred embodiment, the one or more sipes of the sipe pattern extend through the center of the blocks in the axial direction of the blocks. In a preferred embodiment, the one or more sipes of the sipe pattern extend through the whole blocks (from one lateral side to the other lateral side) or at least extend through the center of the blocks in the axial direction of the blocks. More preferably, the one or more long sipes of the sipe pattern extend through the whole blocks (from one lateral side to the other lateral side) or at least extend through the center of the blocks in the axial direction of the blocks.

The sipe pattern is comprised of at least three sipes; preferably from three to five sipes.

Figure 12:
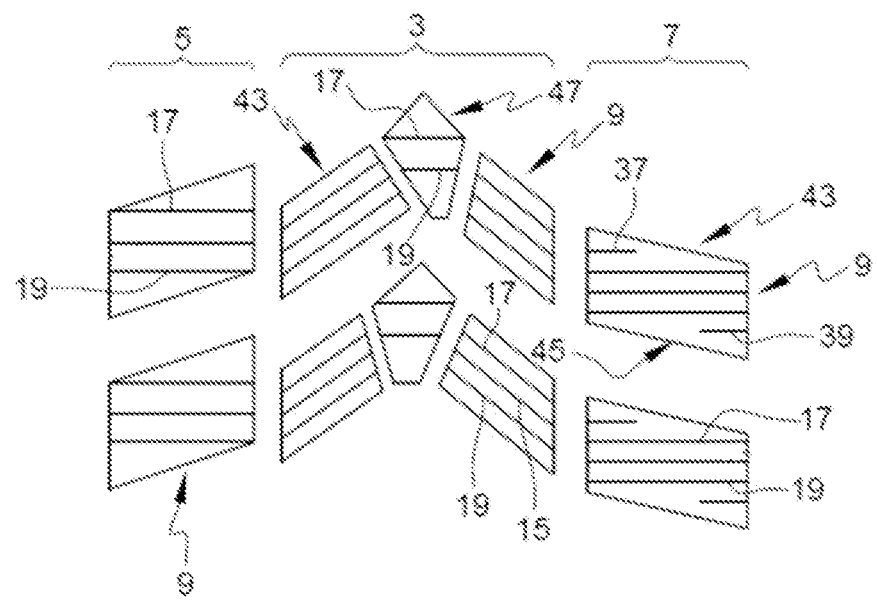
FIG. 12 is an enlarged partial view of a tread portion of an asymmetric tread according to an embodiment in which the tread pattern is directional.

FIG. 1 illustrates a tread pattern that is not directional but the teaching hereof are also valid for a tire having a directional tread pattern as illustrated in FIG. 12.

The sipes of the disclosure are transversal sipes so that the wording "sipes" and "transversal sipes" are used as synonyms unless the contrary is specified. The sipes may comprise curves or corners but extend mainly in the width direction of the tire. One or more sipes can be parallel to the axial direction or show an angle with the axial direction that is up to 50°. For example, one or more sipes extend along the width of the tire in a direction that has an angle with the axial direction of the tire ranging from 0° to 50°; for example, ranging from more than 0° to 45°; for example, from 1° to 40°; for example, from 5° to 35°; for example, from 10° to 30°. In a preferred embodiment, one or more sipes are parallel to the axial direction wherein "parallel" includes small angles from 0° to 8°; for example, from more than 0° to 5° or from 1° to 5°.

Figure 11:
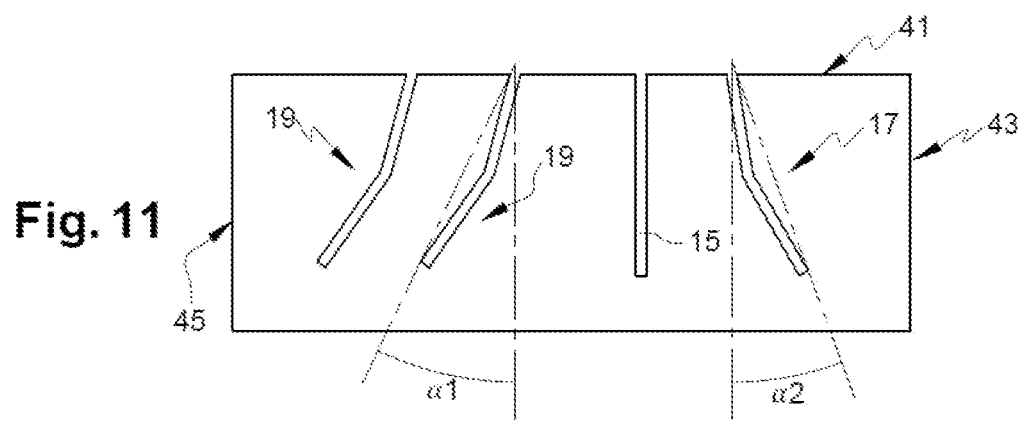
FIG. 11 is a view similar to FIG. 5 but according to an embodiment with an asymmetrical sipe pattern.

While the one or more straight sipes 15 are extending in the radial direction of the tire or have a main sipe direction extending in the radial direction of the tire; the inclined sipes have a main sipe direction that shows an angle α relative to the radial direction of the tire. The main sipe direction of a sipe, such as the main sipe direction of a straight sipe or the main sipe direction of an inclined sipe, is defined to be the line linking the open end of the sipe at the radially outer surface 41 of a tread block (as shown in FIG. 11) or a rib and an innermost end of the sipe in the tire radial direction. It is understood that said line is an imaginary line. The angle α of inclination of the inclined sipes is illustrated, for example, in FIGS. 4 to 6.

In an embodiment, the angle α of inclination shown by the main sipe direction of the inclined sipes is at most 30° relative to the tire radial direction; preferably, at most 27°; more preferably at most 25°; even more preferably, at most 22° and most preferably, at most 20°.

For example, the angle α of inclination shown by the main sipe direction of the inclined sipes is at least 5° relative to the tire radial direction; preferably, at least 10°; more preferably at least 13°; even more preferably, at least 15° and most preferably, at least 18°.

For example, the angle α of inclination shown by the main sipe direction of the inclined sipes is ranging from 5 to 30° relative to the tire radial direction; preferably from 10 to 27°; more preferably ranging from 15 to 25°; and even more preferably from 18 to 22°.

Unless specified otherwise the wording "inclined sipe" refers to both positively inclined sipe and negatively inclined sipe. As a consequence, the values indicated above for the angle α of inclination are the absolute values of said angle.

The one or more inclined sipes can be positively inclined sipes 17 or negatively inclined sipes 19; the one or more positively inclined sipes 17 are inclined in a direction opposite, relative to the tire radial direction, to the one or more negatively inclined sipes 19. In a view showing a cross-section of a block with a sipe pattern in the circumferential direction of the tire, such as in FIGS. 3 to 11, wherein the leading edge 43 of the block is at the right side and the trailing edge 45 of the block is at the left side, the positively inclined sipes 17, 37 have a positive angle α of inclination when measured counterclockwise, whereas the negatively inclined sipes 19, 39 have a negative angle α of inclination when measured counterclockwise. Thus, the positively inclined sipes 17, 37 are inclined toward the leading edge 43 of a block 9, whereas the negatively inclined sipes 19, 39 are inclined toward the trailing edge 45 of a block 9. In the present description, any value given for the angle α is its absolute value.

From the figures, it can be understood that the orientation of the inclined sipes 17, 19, 37, 39 in the sipe pattern is selected to have the main sipe direction of the one or more inclined sipes 17, 19, 37, 39 that is intersecting the main sipe direction of the one or more straight sipes 15 outside the tire. Preferably, at least one straight sipe 15 is arranged between at least one positively inclined sipe 17, 37 and at least one negatively inclined sipe 19, 39. Thus, with preference, the one or more straight sipes 15 and the two or more inclined sipes 17, 19, 37, 39 have diverging directions from their open ends to their innermost ends.

Also, it is preferred that at least two sipes 15, 17, 19 of the sipe pattern have a depth of at least 6 mm; preferably at least 7 mm, more preferably at least 8 mm. For example, at least one straight sipe 15 has a depth of at least 6 mm; preferably at least 7 mm, more preferably at least 8 mm. For example, at least one inclined sipe 17, 19 has a depth of at least 6 mm; preferably at least 7 mm, more preferably at least 8 mm. For example, at least one straight sipe 15 and at least one positively inclined sipe 17 and at least one negatively inclined sipe 19 have a depth of at least 6 mm.

In an embodiment, the sipe pattern is symmetrical about the center plane of the sipe pattern taken in the circumferential direction of the tire, as illustrated in FIGS. 3 to 10. In another embodiment, the sipe pattern is asymmetrical about the center plane of the sipe pattern in the circumferential direction of the tire, as illustrated in FIG. 11.

With reference to FIG. 11, it can be seen that the angle α of inclination shown by the main sipe direction of at least one positively inclined sipe 17 (denoted α2 in FIG. 11) is different from the angle α of inclination shown by the main sipe direction of at least one negatively inclined sipe (denoted α1 in FIG. 11). With preference, the angle α of inclination shown by the main sipe direction of at least one positively inclined sipes 17 (denoted α2 in FIG. 11) is smaller than the angle α of inclination shown by the main sipe direction of at least one negatively inclined sipe 19 (denoted α1 in FIG. 11). This will improve the braking performance of the tire. However, in an embodiment not illustrated, in which the traction performance of the tire shall be improved the person skilled in the art may use a sipe pattern in which the angle α of inclination shown by the main sipe direction of at least one positively inclined sipe is greater than the angle α of inclination shown by the main sipe direction of at least one negatively inclined sipe.

In a preferred embodiment, the one or more inclined sipes have a curved shape along the length of the sipe or comprise at least one fold P1, P2 dividing the inclined sipe in two or more sub-portions being (directly) successive along the length of the sipe. In the latter case, the two or more sub-portions can each be flat or curved along the length of the sipe. In the different embodiments illustrated in FIGS. 4 to 11, each of the different sub-portions 21, 23, 29, 31 are flat.

Figure 4:
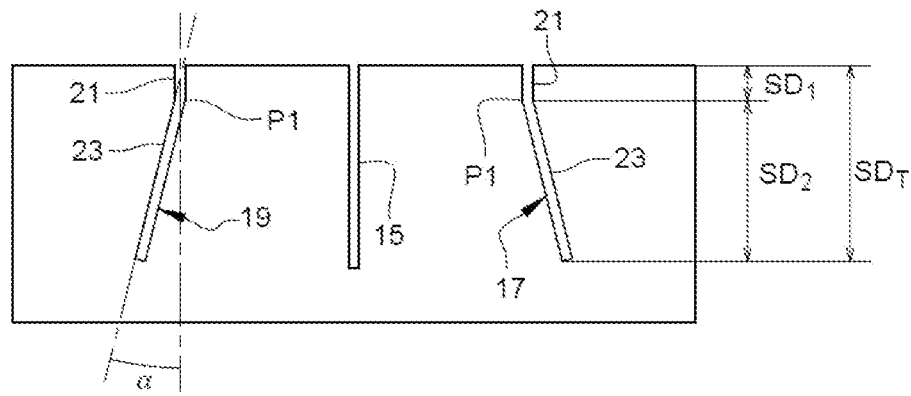
FIG. 4 is a view showing a cross-section in the circumferential direction of the tire of an embodiment of a block with a sipe pattern wherein the inclined sipes have i) a straight sub-portion extending in the tire radial direction and ii) one inclined sub-portion.
Figure 6:
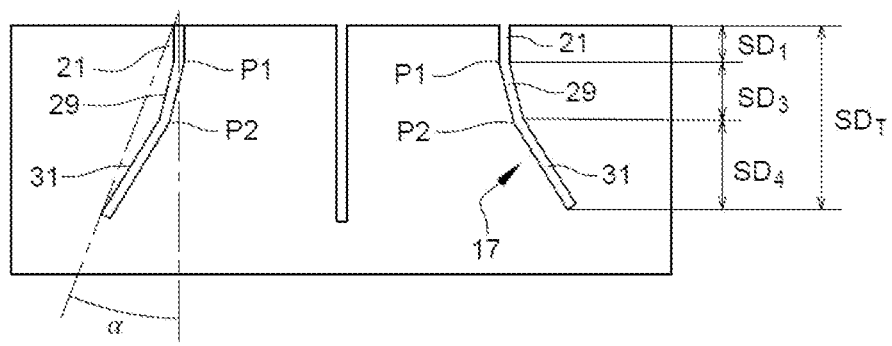
FIG. 6 is a view similar to FIGS. 4 and 5 wherein features are combined, so that the inclined sipes have a straight sub-portion extending in the tire radial direction and more than one inclined sub-portion.
Figure 10:
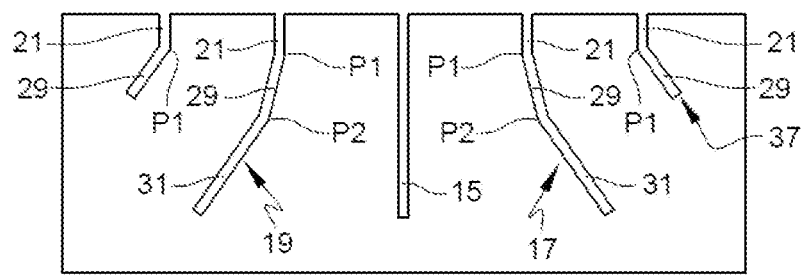
FIG. 10 is a view showing a cross-section of an embodiment of a block with a symmetrical sipe pattern.

In an embodiment illustrated in FIGS. 4, 6 and 10, one or more inclined sipes 17, 19 have a straight sub-portion 21 that is extending in the tire radial direction and one or more inclined sub-portions 23, 29, 31.

For example, at least one positively inclined sipe 17 has a straight sub-portion 21 extending in the tire radial direction and one inclined sub-portion 23. For example, at least one positively inclined sipe 17 has a straight sub-portion 21 extending in the tire radial direction and at least two inclined sub-portions 29, 31 successive to each other.

For example, at least one negatively inclined sipe 19 has a straight sub-portion 21 that is extending in the tire radial direction and one inclined sub-portion 23. For example, at least one negatively inclined sipe 19 has a straight sub-portion 21 that is extending in the tire radial direction and at least two inclined sub-portions 29, 31 successive to each other.

The straight sub-portion 21 is preferably arranged at one end of the inclined sipe selected from the open end of the inclined sipe at the radially outer surface of a tread block or a rib and an innermost end of the inclined sipe in the tire radial direction. With preference, the straight sub-portion 21 is arranged at the open end of the inclined sipe 17, 19, 37, 39 at the radially outer surface of a tread block or a rib. With preference, the straight sub-portion 21 is extending in the radial direction of the tire at a depth (SD1) that is ranging from 5% to 20% of the total depth of the inclined sipe (SDT); preferably from 8% to 18%; more preferably from 10% to 1%.

In an embodiment illustrated in FIGS. 5, 7 to 9 and 11, one or more inclined sipes 17, 19, 37, 39 are devoid of a straight sub-portion.

As shown in FIGS. 4 to 11, the inclined sipes show one or more inclined sub-portions (23, 29, 31). In the context of the disclosure, wherein the inclined sipe shows one or more inclined sub-portions (23, 29, 31), it is preferable that none of the inclined sub-portions (23, 29, 31) should intersect the sipe main direction.

Figure 5:
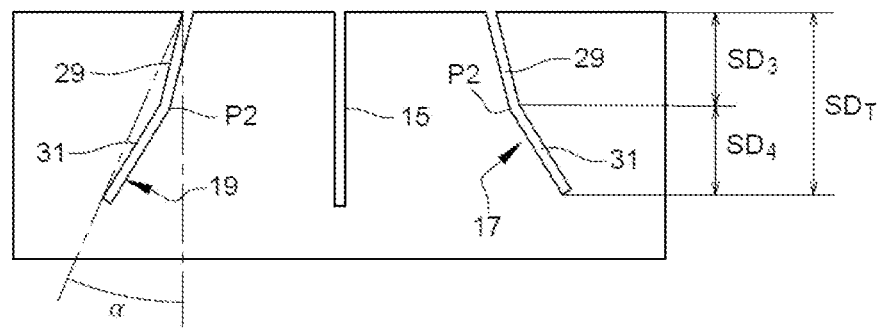
FIG. 5 is a view showing a cross-section of another example of a block with a sipe pattern in the circumferential direction of the tire wherein the inclined sipes have a first inclined sub-portion and at least a subsequent inclined sub-portion.

In an embodiment illustrated in FIG. 4, one or more inclined sipes (17, 19) have a single inclined sub-portion 23. The straight sub-portion 21 and the sub-portion 23 are connected by a fold P1. As illustrated in FIG. 4, when expressed in percentage, the total depth (SDT) of the sipe is the sum of the relative percentage of straight sub-portion 21 (SD1) and the sub-portion 23 (SD2). However, in another embodiment illustrated in FIGS. 5 to 11, one or more inclined sipes 17, 19 have at least two inclined sub-portions 29, 31, wherein two successive sub-portions being connected by a fold P1, P2. As illustrated in FIG. 5, when expressed in percentage, the total depth (SDT) of the sipe is the sum of the relative percentage of the first inclined sub-portion 29 (SD3) and the one or more subsequent inclined sub-portion 31 (SD4).

For example, the angle of inclination relative to the tire radial direction of the single inclined sub-portion 23 is typically within the range of 5° to 20°; preferably from 8° to 18°; and more preferably from 10° to 15°.

Figure 7:
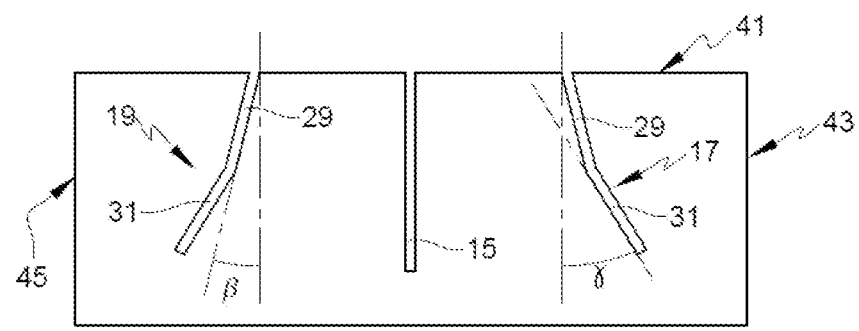
FIG. 7 is a view similar to FIG. 5 but illustrating the different angles of inclination of the several inclined sub-portions of the inclined sipes.

For example, one or more inclined sipes have a first inclined sub-portion 29 and at least a subsequent inclined sub-portion 31; wherein the angle β of inclination relative to the tire radial direction of the first inclined sub-portion 29 is different from the angle γ of inclination of the one or more subsequent inclined sub-portion 31. With preference, as illustrated in FIG. 7, the angle β of inclination relative to the tire radial direction of the first inclined sub-portion 29 is smaller than the angle γ of inclination of the one or more subsequent inclined sub-portion 31. The first inclined sub-portion 29 is the inclined sub-portion that comprises or is closest to the open end of the inclined sipe 17, 19 at the radially outer surface of a tread block or a rib.

For example, the angle β of inclination relative to the tire radial direction of the first inclined sub-portion is normally within the range of 5° to 20°; preferably from 8° to 18°; and more preferably from 10° to 15°.

Whether the inclined sipes comprise a straight sub-portion or not it is preferred that the first inclined sub-portion 29 shows an innermost end in the tire radial direction arranged to be at a depth that is within the range of 40% to 70% of the total depth of the inclined sipe; preferably from 42% to 60%; and more preferably from 45% to 55%. It is understood from the figures that the innermost end in the tire radial direction of the first inclined sub-portion 29 is the fold P2, thus the innermost end of the first inclined sub-portion 29 is at a depth corresponding to SD3 as illustrated in FIG. 5 or to the sum of SD1 and SD3 as illustrated in FIG. 6.

In a sipe pattern according to the disclosure, the number of positively inclined sipes 17, 37 can be the same or different from the number of negatively inclined sipes 19, 39. If the braking performance is to be improved, it is advantageous that the number of negatively inclined sipes 19, 39 is greater than the number of positively inclined sipes 17, 37. If the traction performance is important, it is advantageous that the number of negatively inclined sipes 19, 39 is smaller than the number of positively inclined sipes 17, 37.

In a preferred embodiment of the disclosure, at least two inclined sipes 17, 19, 37, 39 have different depth wherein the one or more inclined sipes being the deepest sipes are long inclined sipes 17, 19 and have a defined depth and at least one inclined sipe is a short inclined sipe 37, 39 having a depth that is reduced and that is within the range of 30% to 70% of the depth of the one or more long inclined sipes 17, 19; preferably within the range of 40% to 60%; and more preferably within the range of 45% to 55%. For example, the depth of the long inclined sipes 17, 19 is ranging from 6 mm to 10 mm; and preferably from 7 mm to 9 mm. It is preferred, as illustrated in FIG. 3, that the bottom of each long inclined sipe 17, 19 is raised in the vicinity of a position where the long inclined sipe 17, 19 opens to a circumferential groove. Such an anchorage of the sipes improve the stiffness of the tire.

For example, the angle α of inclination shown by the main sipe direction of at least one long inclined sipe 17, 19 is different from the angle α of inclination shown by the main sipe direction of at least one short inclined sipe 37, 39. Thus, for example, the angle α of inclination shown by the main sipe direction of at least one long positively inclined sipe 17 is different from the angle α of inclination shown by the main sipe direction of at least one short positively inclined sipe 37. For example, the angle α of inclination shown by the main sipe direction of at least one long negatively inclined sipe 19 is different from the angle α of inclination shown by the main sipe direction of at least one short negatively inclined sipe 39. For example, the angle α of inclination shown by the main sipe direction of at least one long positively inclined sipe 17 is different from the angle α of inclination shown by the main sipe direction of at least one short negatively inclined sipe 39. For example, the angle α of inclination shown by the main sipe direction of at least one long negatively inclined sipe 19 is different from the angle α of inclination shown by the main sipe direction of at least one short positively inclined sipe 37. The values given for angle α are absolute values.

In an embodiment, the angle α of inclination shown by the main sipe direction of at least one long inclined sipe 17, 19 is smaller than the angle α of inclination shown by the main sipe direction of at least one short inclined sipe 37, 39. In another embodiment, the angle α of inclination shown by the main sipe direction of at least one long inclined sipe 17, 19 is equal to or greater than the angle α of inclination shown by the main sipe direction of at least one short inclined sipe 37, 39.

For example, the angle α of inclination shown by the main sipe direction of at least one long inclined sipe 17, 19 is different from the angle α of inclination shown by the main sipe direction of at least one short inclined sipe 37, 39; with preference, the angle α of inclination shown by the main sipe direction of at least one long inclined sipe 17, 19 is smaller than the angle α of inclination shown by the main sipe direction of at least one short inclined sipe 37, 39.

For example, the angle α of inclination shown by the main sipe direction of the long inclined sipes 17, 19 is within the range of 5° to 30° relative to the tire radial direction; preferably from 10 to 27°; more preferably ranging from 15° to 25°; and even more preferably from 18° to 22°. The values given for angle α are absolute values.

For example, the angle α of inclination shown by the main sipe direction of the short inclined sipes 37, 39 is typically within the range of 10° to 30° relative to the tire radial direction; preferably from 15 to 28°; more preferably within the range of 18° to 26°; and even more preferably within the range of 20° to 25°. The values given for angle α are absolute values.

For example, the thickness shown by at least one long inclined sipe 17, 19 is equal to or greater than the thickness shown by at least one short inclined sipe 37, 39. For example, the thickness of a long inclined sipe 17, 19 ranges from 1.05 to 1.50 times the thickness of a short inclined sipe 37, 3; for example, from 1.10 to 1.40 times; for example, from 1.20 to 1.30 times. For example, the thickness of at least one long inclined sipe 17, 19 is at most 0.70 mm; preferably at most 0.60 mm; more preferably at most 0.50 mm; even more preferably at most 0.45 mm; and most preferably at most 0.40 mm. Having short inclined sipes 37, 39 with reduced thickness allows increasing the sipe density in the sipe pattern (i.e., the number of sipes in a given outer surface of the block or the rib).

For example, the one or more long inclined sipes 17, 19 have a first inclined sub-portion 29 and at least a subsequent inclined sub-portion 31 and the one or more short inclined sipes 37, 39 have a single inclined portion or sub-portion 23.

The sipe pattern of the disclosure comprises one or more straight sipes 15 extending in the radial direction of the tire wherein at least one straight sipe 15 is arranged between two inclined sipes 17, 19, 37, 39. In a preferred embodiment illustrated in FIGS. 3 to 11, at least one straight sipe is arranged between one or more positively inclined sipes and one or more negatively inclined sipes.

In a view showing a cross-section of a block with a sipe pattern in the circumferential direction of the tire, such as in FIGS. 3 to 11, wherein the leading edge 43 of the block is at the right side and the trailing edge 45 of the block is at the left side, the sipe pattern may comprise from the leading edge to the trailing edge one or more positively inclined sipes, one or more straight sipes and one or more negatively sipes.

FIGS. 3 to 11 show a preferred embodiment, in which the straight sipe 15 or at least one straight sipe 15 has the same depth as the one or more inclined sipes 17, 19 being the deepest, i.e., the long inclined sipes. However, the disclosure provides for both long straight sipes and short straight sipes. For example, the long straight sipes 15 have a depth that is about the same that the long inclined sipes 17, 19. It is preferred that the bottom of each long straight sipe 15 is raised in the vicinity of a position where the long straight sipe 15 opens to a circumferential groove (as shown in FIG. 3).

In an embodiment not illustrated, the sipe pattern comprises at least two straight sipes having different depth so that one or more straight sipes being the deepest are deep straight sipes and have a defined depth and at least one straight sipe is a reduced straight sipe having a depth that is within the range of 30% to 70% of the depth of the one or more deep straight sipes; preferably from 40% to 60%; and more preferably from 45% to 55%.

In one embodiment of this invention, the one or more straight sipes have a reduced depth compared to the inclined sipes or at least the long inclined sipes, so that the one or more straight sipes are one or more reduced straight sipes having a depth that is within the range of 30% to 70% of the depth of the one or more long inclined sipes; preferably from 40% to 60%; and more preferably from 45% to 55%.

Figure 8:
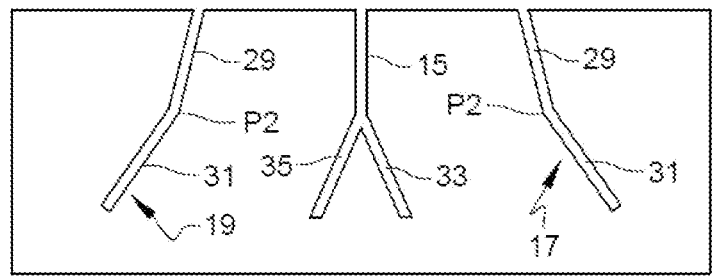
FIG. 8 is a view similar to FIG. 5 but according to an embodiment in which one or more straight sipes are forked.
Figure 9:
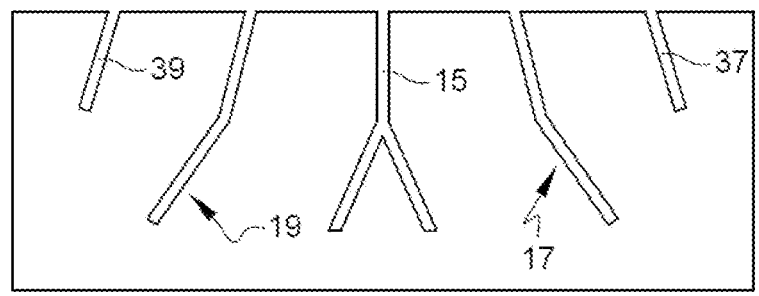
FIG. 9 is a view similar to FIG. 8 but according to an embodiment in which at least two inclined sipes have a different depth.

In an embodiment depicted in FIGS. 8 and 9, one or more of the straight sipes 15 are forked sipes and have their radially inner sub-portion being divided in two branches 33, 35. The radially outer sub-portion is comprising the open end of the sipe at the radially outer surface of a tread block or a rib and the radially inner sub-portion is comprising the two innermost ends of the sipe in the tire radial direction. It is understood that the forked straight sipes have a main sipe direction that is extending in the radial direction of the tire so that the main sipe direction of the forked straight sipes is extending between the two branches 33, 35 of the radially inner sub-portion of the sipe. With preference, the branches are inclined; more preferably the angle of inclination shown by branches 33, 35 is within the range of 5° to 30° relative to the tire radial direction; preferably from 10° to 27°; more preferably ranging from 15° to 25°; and even more preferably from 18° to 22°. The values given for the angle of inclination are absolute values.

If straight sipes 15 are forked, they comprise a radially outer sub-portion opened at the tread surface and a radially inner sub-portion that is divided in two branches. It is preferable that the radially outer portion is extending in the radial direction of the tire at a depth that is within the range of 30% to 70% of the total depth of the straight sipes 15; preferably from 40% to 60%; and more preferably from 45% to 55%. If the forked portion represents 50% or more of the total depth of the sipe, this allows to maintain a certain level of performance of the tire in braking and traction on snow when it is worn, since new inclined sipes (i.e., the two branches) will appear.

Figure 13:
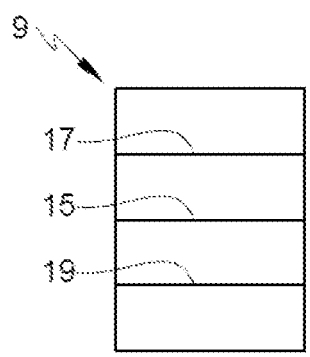
FIG. 13 is a view showing the radially outer surface of a block with a sipe pattern according to another embodiment of the invention.
Figure 14:
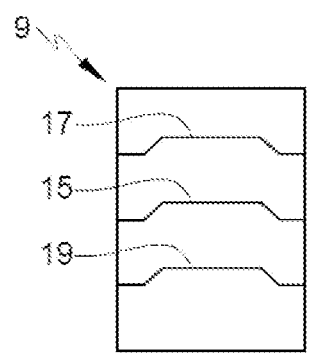
FIG. 14 is a view showing the radially outer surface of a block with a sipe pattern according to another embodiment of the invention.
Figure 15:
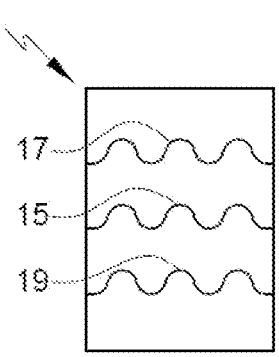
FIG. 15 is a view showing the radially outer surface of a block with a sipe pattern according to yet another embodiment of the invention.

With reference to FIGS. 13 to 15, it can be seen that one or more sipes can be shaped or not in the width (or lateral) direction of the tire. For example, the sipe can be linear in the tread surface view according to the width direction of the tire as illustrated in FIG. 13. The disclosure encompasses embodiments in which one or more sipes show a non-linear shape in the tread surface view in the width direction of the tire; such as a trapezoidal shape in the tread surface view as illustrated in FIG. 14 (e.g., if the sipes show a projection portion bent in a trapezoidal manner in the tread surface view, the projection is formed at the center portion of the block in the width direction) or a zig-zag shape or a wave shape in the tread surface view according to the width direction as illustrated in FIG. 15.

EXAMPLES

Tests have been performed at −10° C. on snow. In a first test, a tire "BLOCK 13" was tested, said tire had blocks with a sipe pattern with three long sipes, wherein the main sipe direction of inclined sipes is intersecting the straight sipe outside the tire and wherein the angle α of the inclined sipes was 10°. The tire has been found to have both higher friction coefficient and traction force when compared to a tire having straight sipes only (i.e., the control tire).

Figure 16:
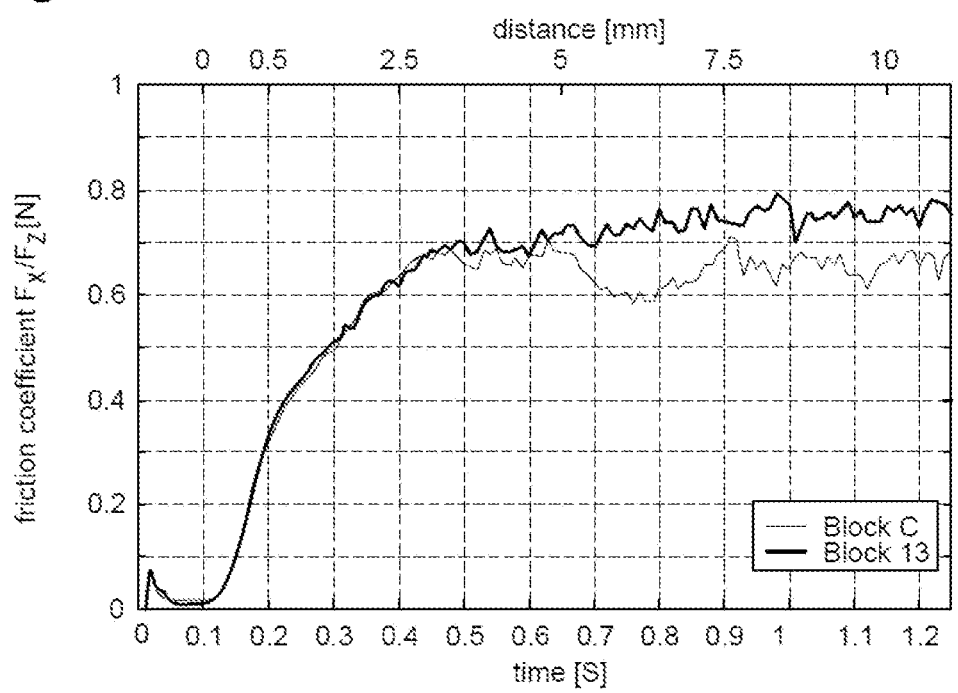
FIG. 16 shows a graph illustrating friction coefficient measurements.
Figure 17:
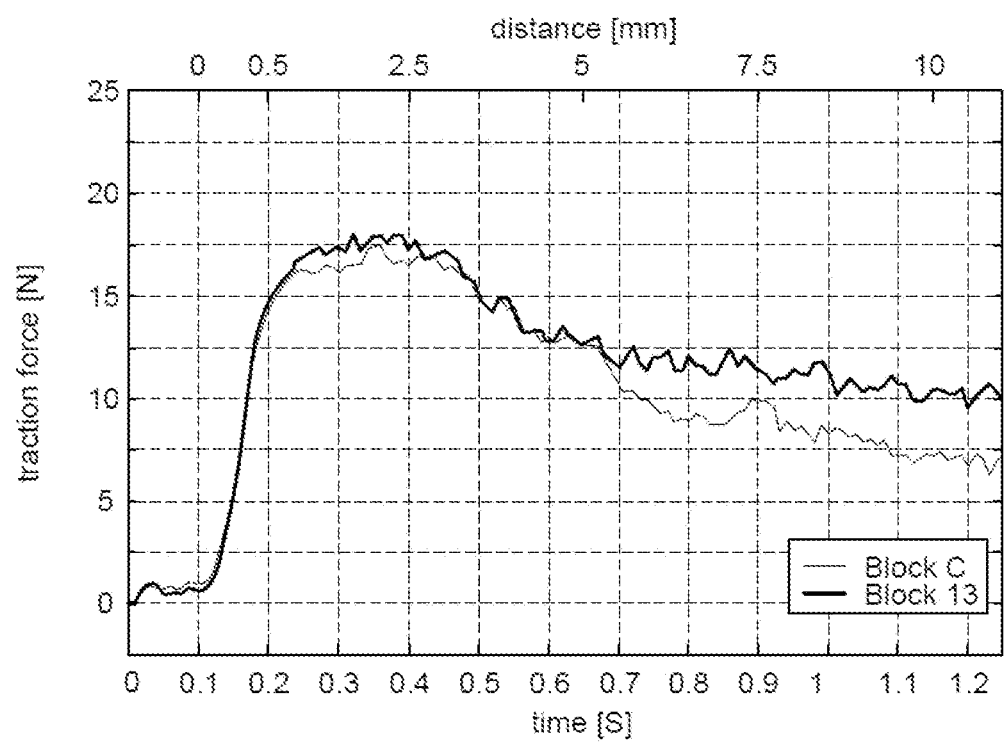
FIG. 17 shows a graph illustrating traction force measurements.

Results are provided in the below table and further results are shown in FIGS. 16 and 17.

|  | CONTROL | BLOCK 13 |
| --- | --- | --- |
| Braking | 100 | 102.2 |
| Acceleration | 100 | 100.7 |

Figure 18:
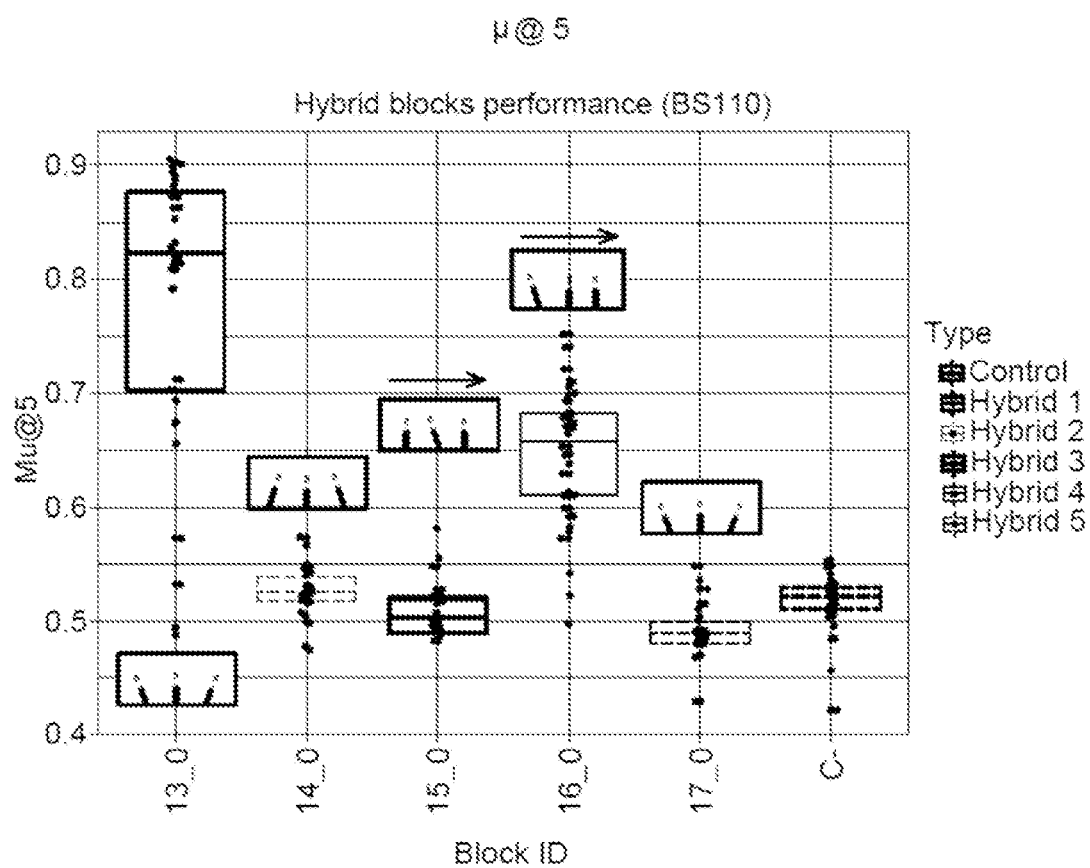
FIG. 18 shows a graph comparing the results of friction coefficient measurements of different sipe patterns.

Different sipe patterns have been tested, the results are shown in FIG. 18. In this figure BLOCK 13 corresponds to Hybrid 1. C is the control block that has only straight long sipes. C is the last example on the right-hand side of FIG. 18 and Hybrid 1 is the first example on the left-hand side in FIG. 18. Hybrid 2 is the second example, Hybrid 3 is the third example, Hybrid 4 is the fourth example and Hybrid 5 is the fifth example shown from left to right in FIG. 18. It can be seen that a higher friction coefficient is obtained for the tire with the sipe pattern according to an embodiment of the invention, i.e., Hybrid 1. Except for Hybrid 5 that had sipes with a depth of about 4 mm (i.e., short sipes only); the depth of the sipes was about 8 mm (i.e., long sipes).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire with a tread portion comprising one or more tread blocks and/or one or more ribs, and having a plurality of sipes formed in one or more tread blocks and/or one or more ribs, each sipe being opened at the radially outer surface of a tread block or a rib; wherein one or more blocks and/or one or more ribs have at least one sipe pattern comprising, in the circumferential direction of the tire, one or more straight sipes extending in the radial direction of the tire and two or more inclined sipes; wherein at least one straight sipe is arranged between two inclined sipes; wherein the inclined sipes have a main sipe direction that is inclined by an angle $\alpha$ relative to the radial direction, the main sipe direction of an inclined sipe being the line linking the open end of the sipe at the radially outer surface of a tread block or a rib and an innermost end of the sipe in the tire radial direction; wherein one or more inclined sipes are positively inclined sipes and one or more inclined sipes are negatively inclined sipes; the one or more positively inclined sipes being inclined in a direction opposite, relative to the tire radial direction, to the one or more negatively inclined sipes; and wherein at least two inclined sipes have different depth wherein the one or more inclined sipes being the deepest sipes are long inclined sipes and have a defined depth and at least one inclined sipe is a short inclined sipe having a depth that is ranging from 30 to 70% of the depth of the one or more long inclined sipes; the depth of a sipe being determined according to the radial direction of the tire, wherein the one or more long inclined sipes have a first inclined sub-portion and at least a subsequent inclined sub-portion and the one or more short inclined sipes have a single inclined portion or sub-portion.

2. The tire according to claim 1 wherein the angle a of inclination shown by the main sipe direction of at least one long inclined sipe is smaller than the angle $\alpha$ of inclination shown by the main sipe direction of at least one short inclined sipe.

3. The tire according to claim 1 wherein the thickness shown by at least one long inclined sipe is equal to or greater than the thickness shown by at least one short inclined sipe.

4. The tire according to claim 1 wherein at least one long positively inclined sipe and at least one long negatively inclined sipe have a depth of at least 6 mm.

* * * * *